United States Patent [19]
Aslanis et al.

[11] Patent Number: 5,901,180
[45] Date of Patent: May 4, 1999

[54] FRAME SYNCHRONIZATION IN MULTICARRIER TRANSMISSION SYSTEMS

[75] Inventors: James T. Aslanis; Jacky S. Chow, both of Mountain View, Calif.

[73] Assignee: Amati Communications Corp., San Jose, Calif.

[21] Appl. No.: 08/770,702

[22] Filed: Dec. 19, 1996

Related U.S. Application Data

[63] Continuation of application No. 08/275,409, Jul. 15, 1994, Pat. No. 5,627,863.

[51] Int. Cl.$^6$ .............................. H04L 7/06; H04L 23/02
[52] U.S. Cl. ......................... 375/261; 375/364; 375/367; 370/480; 370/515
[58] Field of Search ..................................... 375/260, 261, 375/298, 362, 364, 365, 367, 368; 370/464, 480, 483, 485, 491, 500, 503, 509, 510, 512, 515; 364/717.01

[56] References Cited

U.S. PATENT DOCUMENTS

| | | |
|---|---|---|
| 4,450,558 | 5/1984 | Hampton et al. ........................ 370/106 |
| 4,644,523 | 2/1987 | Horowitz .................................. 370/18 |
| 5,170,413 | 12/1992 | Hess et al. . |
| 5,305,349 | 4/1994 | Dent ............................................ 375/1 |
| 5,345,440 | 9/1994 | Gledhill et al. ............................ 370/19 |
| 5,440,561 | 8/1995 | Werronen .............................. 370/105.1 |
| 5,444,697 | 8/1995 | Leung et al. ............................... 370/19 |
| 5,590,160 | 12/1996 | Ostman ................................... 375/367 |
| 5,666,378 | 9/1997 | Marchetto et al. ..................... 375/222 |
| 5,673,296 | 9/1997 | Ohgane ................................... 375/368 |

FOREIGN PATENT DOCUMENTS

| | | |
|---|---|---|
| 0 529 421 A2 | 3/1993 | European Pat. Off. . |
| WO 93/06917 | 5/1993 | WIPO . |
| WO 95/03656 A1 | 2/1995 | WIPO . |
| WO95/05042 | 2/1995 | WIPO . |

OTHER PUBLICATIONS

Bingham, John A.C., Multicarrier Modulation for Data Transmission: An Idea Whose Time Has Come, IEEE Communications Magazine, May 1990.

Chow, Jacky S. et al., Equalizer Training Algorithms for Multicarrier Modulation Systems, IEEE, Feb. 1993.

Chow, Jacky S., et al, A Discrete Multitone Transceiver System for HDSL Applications, IEEE Journal on Selected Areas in Communications, vol. 9, No. 6, Aug., 1991.

Chow, Jacky S., et al., DMT Initialization: Parameters Needed for Specification In a Standard, Mar. 1993, T1E1.4, ANSI Standards Committee (Submission T1E1.Apr. 1993–022).

Leonard J. Cimini, Jr., "Analysis and Stimulation of a Digital Mobile Channel Using Orthogonal Frequency Division Multiplexing", Jul. 7, 1985, IEEE Transactions on Communications, vol. COM–33, No. 7.

Kirkman, et al., Detection of Characteristic Phases Using FFT's, International Conference on Acoustics, Speech and Signal Processing IEEE, Mar. 1992.

*Primary Examiner*—Amanda Le
*Attorney, Agent, or Firm*—Beyer & Weaver, LLP

[57] ABSTRACT

A discrete multitone modulation transmission system is described in which frame synchronization is monitored using a transmitted synchronizing frame. The existence or loss of frame synchronization is determined by comparing the values of the synchronizing frame with corresponding stored values.

43 Claims, 2 Drawing Sheets

FRAME SYNCHRONIZATION IN MULTICARRIER TRANSMISSION SYSTEMS

This is a continuation application of prior application Ser. No. 08/275,409 filed on Jul. 15, 1994, now U.S. Pat. No. 5,627,863.

This invention relates to transmission systems using multicarrier modulation, and is particularly concerned with frame synchronization in such systems, referred to below for brevity simply as multicarrier systems.

RELATED APPLICATIONS

Reference is directed to the United States patent applications identified below, the entire disclosure of each of which is hereby incorporated herein by reference:

U.S. Pat. No. 5,479,447 in the name of P. S. Chow et al. and entitled "Method And Apparatus For Adaptive, Variable Bandwidth, High-Speed Data Transmission Of A Multicarrier Signal Over Digital Subscriber Lines", which describes details of a multicarrier system using DMT modulation.

U.S. patent application Ser. No. 08/107,200 filed Aug. 17, 1993, now U.S. Pat. No. 5,596,604, in the name of J. M. Cioffi et al. and entitled "Multicarrier Modulation Transmission System With Variable Delay", which also describes details of a multicarrier system using DMT modulation.

U.S. patent application Ser. No. 08/109,489 filed Aug. 20, 1993, U.S. Pat. No. 5,400,322, in the name of R. R. Hunt et al. and entitled "Updating Of Bit Allocations In A Multicarrier Modulation Transmission System", which describes a manner of maintaining bit allocations in a multicarrier system.

BACKGROUND OF THE INVENTION

The principles of multicarrier modulation are described for example in "Multicarrier Modulation For Data Transmission: An Idea Whose Time Has Come" by John A. C. Bingham, IEEE Communications Magazine, Vol. 28, No. 5, pages 5–14, May 1990. As is known, in a transmission system using multicarrier modulation, FDM (frequency division multiplexed) sub-carriers spaced within a usable frequency band of a transmission channel, forming a set of sub-carriers, are modulated at a block or symbol transmission rate of the system. The bits of input data for transmission within each block or symbol period are allocated to the sub-carriers in a manner which is dependent upon the signal-to-noise ratios (SNRs) of the sub-carriers, typically so that the bit error rates of the sub-carriers, as monitored at the receiver, are substantially equal. As a result, the different sub-carriers carry different numbers of bits in each symbol period. With an appropriate allocation of bits and transmit powers to the sub-carriers, such a system provides a desirable performance.

One particular form of multicarrier modulation, in which the modulation is effected using a discrete Fourier transform, is referred to as discrete multitone, or DMT, modulation. The related applications referred to above disclose details of multicarrier systems using DMT modulation.

As in any communication system, it is necessary to establish and maintain synchronization between the transmitter and receiver of a DMT or other multicarrier system. Frequency synchronization is conveniently provided in a DMT system by using one of the multiple tones as a pilot tone to control a phase locked loop at the receiver, as indicated in Standards Committee Contribution T1E1.4/93-022 by J. S. Chow et al. entitled "DMT Initialization: Parameters Needed For Specification In A Standard", Mar. 8, 1993. This reference also outlines other initialization processes of a DMT system, including the allocation of bits to sub-carriers or tones of the system.

In addition to this frequency synchronization, synchronization of the transmitted blocks or symbols of data is required. This is referred to herein as frame synchronization, each frame corresponding to one block or symbol of the multicarrier system, for consistency with the same term as used in single carrier transmission systems. It should be appreciated that each frame, block, or symbol can comprise a substantial amount of information, for example about 1700 bits (providing a transmission rate of about 6.8 Mb/s with a symbol period of about 250 $\mu$s).

A single carrier transmission system, for example a QAM (quadrature amplitude modulation) system, usually operates entirely in the time domain. In such a system, a relatively "random" frame synchronization sequence can be used to maintain frame synchronization, the sequence being inserted directly into the time-domain signal sample stream at the transmitter and being extracted and correlated with a stored copy of the sequence at the receiver. A large correlation result indicates that frame synchronization has been maintained, and a small correlation result indicates a loss of frame synchronization, i.e. that there has been a slip by an unknown number of time-domain samples. In the latter case the receiver instigates a search procedure to resynchronize the receiver, i.e. to re-align the frame boundaries at the receiver to those at the transmitter.

This time domain frame synchronization provides a simple yes or no answer to the question of whether the receiver is frame synchronized. To resynchronize the receiver when frame synchronization is lost, the system may be required to correlate and search through a large number of possible frame alignments. This is a time-consuming, and hence undesirable, procedure.

An object of this invention is to provide an improved method of providing frame synchronization in a transmission system using multicarrier modulation, and an improved transmission system which makes use of this method.

SUMMARY OF THE INVENTION

One aspect of this invention provides a method of maintaining frame synchronization in a multicarrier modulation transmission system in which a synchronizing frame containing a synchronizing pattern is periodically transmitted, comprising the steps of: storing complex amplitudes of the synchronizing frame; correlating the complex amplitudes of the synchronizing frame with stored information representing the synchronizing pattern, thereby to produce a correlation result; and determining whether the correlation result falls below a threshold value, indicating a loss of frame synchronization, and in this event: performing a plurality of correlations between the stored information and the stored complex amplitudes in each case multiplied by a respective complex value representing a respective complex derotation of the stored complex amplitudes, each complex derotation corresponding to a respective time shift of the synchronizing frame, thereby to produce a plurality of correlation results each corresponding to a respective time shift; determining from the plurality of correlation results a time shift for restoring frame synchronization; and adjusting a frame boundary in accordance with the determined time shift to restore frame synchronization.

For a discrete multitone modulation transmission system, the method preferably includes the steps of: using a tone having a predetermined frequency for frequency synchronization between a transmitter and a receiver of the system; at the transmitter, converting complex amplitudes in the frequency domain into time domain values using an N-point Inverse Fast Fourier Transform; sampling time domain values at the transmitter at a sampling frequency which is j times the predetermined frequency, where j is an integral power of two; and at the receiver, converting time domain values into complex amplitudes in the frequency domain using an N-point Fast Fourier Transform; each of said complex derotations corresponding to a respective one of N/j time shifts within the duration of one frame. This is particularly advantageous if the synchronizing frame is periodically transmitted once every Q frames, where Q is an integer greater than N/j, because it enables frame synchronization to be restored between two consecutive synchronizing frames.

Preferably each correlation result is produced by multiplying each complex amplitude by a corresponding complex amplitude from the stored information representing the synchronizing pattern, and summing the real parts of the complex products. The method preferably includes the step of weighting the complex amplitudes being multiplied, the weighting for each complex amplitude being multiplied preferably being dependent upon a signal-to-noise ratio of a multicarrier channel associated with the respective complex amplitude.

Another aspect of this invention provides a multicarrier modulation transmission system receiver comprising: a Fast Fourier Transform (FFT) unit for transforming time domain values into complex amplitudes in the frequency domain; a buffer for supplying received time domain values to the FFT unit in accordance with a frame boundary; a correlator for correlating complex amplitudes of a synchronizing frame of the system with a synchronizing pattern stored at the receiver to produce a correlation result; and a control unit responsive to the correlation result being below a threshold value to adjust the frame boundary by a time shift determined by performing a plurality of correlations between the stored synchronizing pattern and the complex amplitudes in each case multiplied by a respective complex value representing a respective complex derotation of the complex amplitudes corresponding to a respective time shift of the synchronizing frame, and selecting the best correlation result.

BRIEF DESCRIPTION OF THE DRAWINGS

The invention will be further understood from the following description with reference to the accompanying drawings, in which.

DETAILED DESCRIPTION

Figure 1:
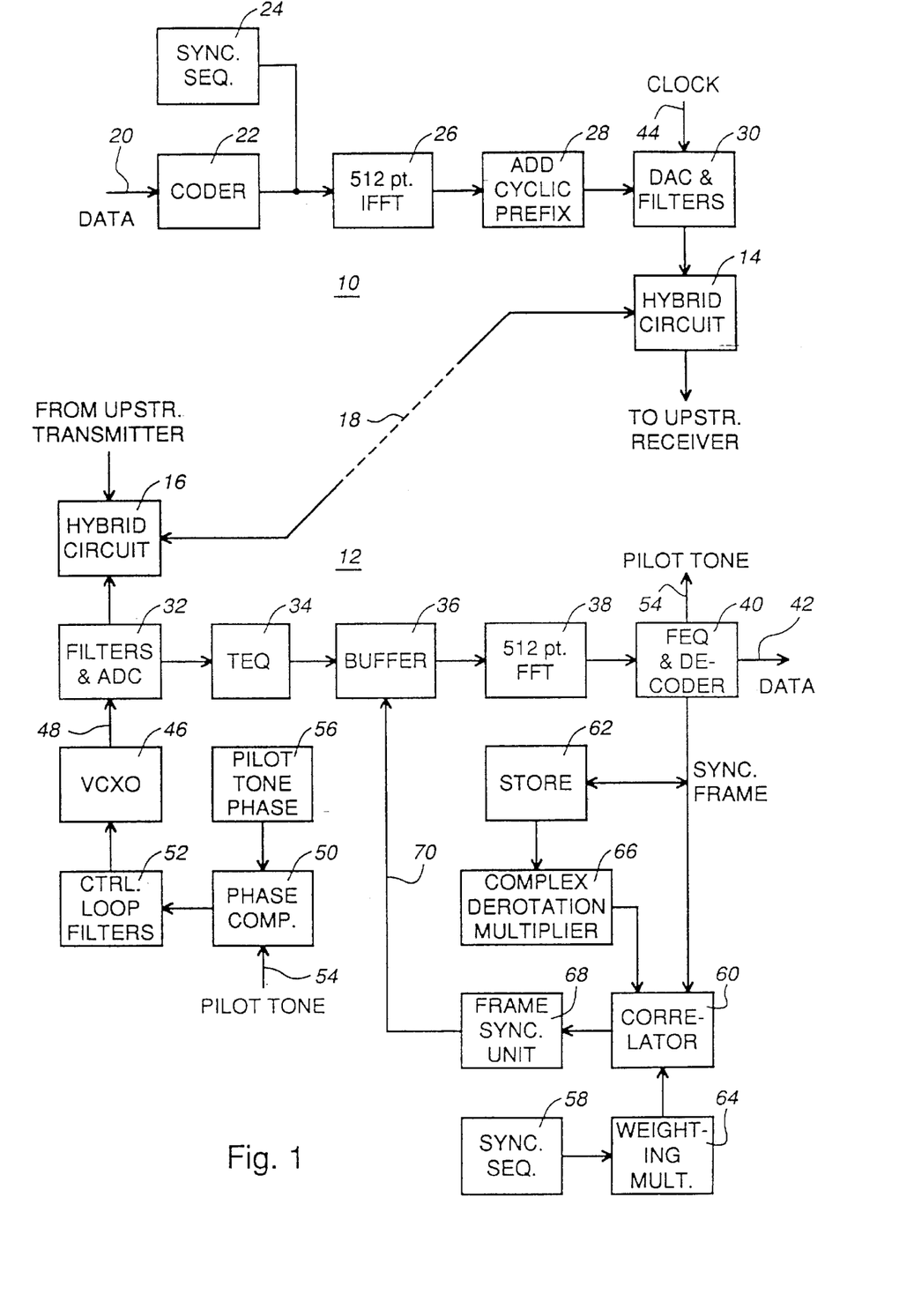
FIG. 1 illustrates parts of a transmission system using multicarrier modulation, in which frame synchronization is maintained and restored in accordance with an embodiment of this invention.

Referring to the drawing, a multicarrier system includes a DMT (discrete multitone) transmitter 10 and a DMT receiver 12 which are coupled via respective hybrid circuits 14 and 16 to a transmission path 18, for example a two-wire telephone subscriber line, for communicating signals in what is referred to here as a downstream direction from the transmitter 10 to the receiver 12. An upstream transmitter (not shown, but which can be similar to the transmitter 10) is coupled to the hybrid circuit 16, and an upstream receiver (not shown, but which can be similar to the receiver 12) is coupled to the hybrid circuit 14, for communicating signals in the opposite, upstream, direction via the path 18. For example, the system may be an ADSL (asymmetric digital subscriber line) system in which the transmitted bit rate is greater in the downstream direction than in the upstream direction.

The transmitter 10 is supplied via a path 20 with data to be transmitted, and comprises a coder 22, a frame synchronizing sequence source 24, an IFFT (Inverse FFT, or Inverse Fast Fourier Transform) unit 26 which for example implements a 512-point IFFT, a cyclic prefix adder 28, and a unit 30 comprising a DAC (digital-to-analog converter) and filters whose output is coupled to the hybrid circuit 14.

Conversely, the receiver 12 comprises a unit 32 which is supplied with a received signal from the hybrid circuit 16 and comprises filters and an ADC (analog-to-digital converter), a time domain equalizer (TEQ) 34, a buffer 36, a unit 38 which implements a 512-point FFT, and a frequency domain equalizer (FEQ) and decoder unit 40 which reproduces the original data on an output path 42. The buffer 36 serves for serial-to-parallel conversion of signals for supply to the FFT unit 38, the cyclic prefix not being supplied to the FFT unit 38 and thereby being removed. Other parts of the receiver 12 illustrated in the drawing relate to frequency and frame synchronization and are described below.

The downstream signal on the path 20 is divided into frames and encoded by the coder 22 into frequency domain multicarrier symbols which are supplied to the IFFT unit 26. Each frame of data is represented by a respective multicarrier symbol, which comprises a complex amplitude (i.e. two amplitudes, for real and imaginary signal components) for each of a number of sub-carriers or tones of the system. For example, the system may use 256 discrete tones or sub-carriers with frequencies of n×4.3125 kHz, where n is a number of the tone or carrier from 1 to 256. Each tone amplitude is allocated a variable number of bits of the signal, in accordance with a bit allocation scheme which for example can be as described in the related application by R. R. Hunt et al. referred to above. The number of bits allocated to each tone amplitude in each multicarrier symbol period of for example about 250 µs can be zero (i.e. the tone is not being used for the signal) or can vary from a minimum number, for example 2 bits, to a maximum number, for example in a range from 10 to 16 bits.

For frame synchronization as further described below, a synchronizing frame containing a synchronizing sequence generated by the source 24 is periodically inserted into the data flow from the coder 22 to the IFFT unit 26 (a time domain version of the synchronizing sequence could alternatively be inserted between the units 26 and 28). For example, a synchronizing frame is provided as every Q=69-th frame or multicarrier symbol, so that each synchronizing frame is followed by 68 data frames. The synchronizing sequence is for example a pseudo-random sequence as described further below, the same sequence being provided for each synchronizing frame.

At the input to the IFFT unit 26, one specific tone in every frame is reserved as a pilot tone and carries no information, thereby providing a transmitted pilot tone which serves for frequency synchronization as described further below.

Each frequency domain multicarrier symbol is transformed into a time domain multicarrier symbol by the IFFT unit 26. The time domain multicarrier symbol thus comprises 512 real-valued time domain samples, which are supplied to the cyclic prefix adder 28. For each multicarrier symbol, the cyclic prefix adder 28 supplies a resulting serial stream of for example 544 real-valued time domain samples to the DAC and filter unit 30, which converts these samples into filtered analog signals which are transmitted via the hybrid circuit 14 to the transmission path 18. The 544 samples are constituted by the 512 samples supplied by the IFFT unit 26, prefixed by a repetition of the last 32 of these samples added by the cyclic prefix adder 28. The use and benefits of a cyclic prefix added in this manner are known for example from "A Discrete Multitone Transceiver System For HDSL Applications" by J. S. Chow et al., IEEE Journal on Selected Areas in Communications, Volume 9, No. 6, pages 895 to 908, August 1991.

In the receiver 12, the signal received via the transmission path 18 is supplied by the hybrid circuit 16 to the filter and ADC unit 32, to reproduce the 544 serial samples per multicarrier symbol which are supplied to the time domain equalizer (TEQ) 34. The TEQ 34 is a finite impulse response filter which serves to limit most of the impulse response to less than the duration of the cyclic prefix, so that subsequent removal of the cyclic prefix reduces interference between consecutive multicarrier symbols. The equalized serial time domain sample stream is supplied to the buffer 36, which produces at its parallel output the 512 time domain samples of each multicarrier symbol, the 32 bits of the cyclic prefix thereby being removed. These 512 time domain samples are supplied to the 512-point FFT unit 38 and are transformed by this unit to a frequency domain multicarrier symbol, comprising 256 complex tone amplitudes, which is supplied to the frequency domain equalizer (FEQ) in the unit 40.

The FEQ comprises a complex signal one-tap adaptive equalizer for each of the 256 tones. The FEQ and decoder unit 40 can for example be of the form illustrated in FIG. 3 of the related application by R. R. Hunt et al. referred to above. The unit 40 produces the resulting decoded received signal on the outgoing data path 42.

Although not described further here, the transmitter 10 and receiver 12 can also implement variable delay buffering and trellis coded modulation, as described for example in the related application by J. M. Cioffi et al. referred to above. Apart from the functions of the hybrid circuits 14 and 16, most or all of the functions at each of the transmitter 10 and the receiver 12 can be implemented by one or more digital signal processors.

The DAC in the transmitter unit 30 is supplied via a line 44 with a clock signal at a desired sampling frequency for operation of the DAC. The ADC in the receiver unit 32 is required to be synchronized to a related frequency (the two frequencies can be exactly the same, or one can be an integer multiple of the other, or they may be related in a manner to accommodate rate conversion through sample stuffing, interpolation, or decimation). It is assumed here for simplicity that the ADC in the unit 32 operates at the sampling frequency of the DAC in the unit 30. To provide the frequency synchronization, as indicated above one of the 256 tones is used exclusively as a pilot tone. Thus the allocation of bits of the signal on the path 20 to this tone is zero for each multicarrier symbol.

For convenience and simplicity, the sampling frequency and the pilot tone frequency are selected so that the sampling frequency is an integral power of two times the pilot tone frequency. For example, the 64-th tone (n=64) having a frequency of 64×4.3125=276 kHz is used as the pilot tone, and the sampling frequency is 8 times this pilot tone frequency, or 2.208 MHz. This relationship provides a particular advantage for the frame synchronization as described further below.

The pilot tone can have a constant phase, or it can carry over successive multicarrier symbols a specific phase pattern or long pseudo-random sequence which is known to both the transmitter and the receiver. The IFFT unit 26 is supplied with a complex amplitude for the pilot tone which represents the desired contents of the pilot tone. For simplicity and convenience, it is assumed here that the pilot tone has a constant phase, and accordingly the IFFT unit 26 is supplied with a constant complex amplitude, representing this constant phase, for the pilot tone.

The receiver 12 includes a voltage controlled crystal oscillator (VCXO) 46 which produces on a line 48 a sampling clock signal for the ADC in the unit 32, synchronized to the 2.208 MHz sampling frequency of the transmitter 10 by a control loop which includes a phase comparator 50 and digital and analog control loop filters represented by a unit 52. The FEQ and decoder unit 36 supplies the phase information of the received pilot tone via a line 54 to the phase comparator 50, and a stored reference phase is also supplied to the phase comparator 50 from a store 56. The phase comparator 50 produces at its output a digital phase error control signal which is filtered by digital and analog filters in the unit 52 to produce an analog control voltage; this is used to control the VCXO 46 to maintain frequency synchronization.

As explained in the background of the invention, frame synchronization of the transmitted multicarrier symbols of data must also be maintained between the transmitter and receiver. In other words, the same frame boundaries as are used for the multicarrier symbols at the input to the IFFT unit 26 in the transmitter 10 must be used for the FFT unit 38 in the receiver 12. In the receiver 12 the frame boundaries are used by the buffer 36 to determine which sequences, each of 512 time domain samples, are supplied to the FFT unit 38 to be transformed into the respective frequency domain multicarrier symbols.

As described above, in the transmitter 10, every 68 data frames are supplemented by a synchronizing frame, thereby forming a superframe of Q=69 consecutive frames or multicarrier symbols. This number Q is selected to provide a balance between data carrying capacity of the system (for which a high value of Q is preferred) and frame resynchronization time (for which a low value of Q is preferred). The synchronizing frame contains pseudo-random data which can be applied to the tones of the synchronizing frame multicarrier symbol in any of a variety of different ways. A description of one of these ways, given for example, follows.

In the transmitter 10, a binary pseudo-random sequence of length 512 is produced by the source 24 in accordance with the equations:

$x[p]=1$ for $p=1$ to 9

$x[p]=x[p-4]\oplus x[p-9]$ for $p=10$ to 512 where x[p] is the binary value of bit p of the sequence and $\oplus$ represents modulo-2 addition. The bits of this sequence are grouped into 256 pairs of bits, of which the first pair of bits is used for the d.c. and Nyquist subcarriers (for which the allocated energy is zero so that this pair of bits is effectively ignored) and the remaining 255 pairs of bits are assigned to respective tones of the multicarrier symbol of the synchronizing frame in order of increasing frequency, the four possible combinations (0,0), (0,1), (1,0), and (1,1) of each pair of bits being mapped directly to 4-QAM points of the respective tone of the synchronizing frame. In other words, each pair of bits provides a complex amplitude which is supplied to the IFFT unit 26 for the respective tone of the synchronizing frame. The pilot tone is then overwritten with its own appropriate complex amplitude as described above.

Tones which may be allocated fewer than two bits per symbol in accordance with the bit allocations established for the system either can be discarded at the receiver or can have their amplitudes suppressed at the transmitter so that they are not transmitted, thereby conserving power at the transmitter and avoiding possible interference among tones due to imperfect equalization or filtering. In the latter respect, the bit allocation table which is provided at both the transmitter and the receiver can be used to provide an energy scaling vector for each tone, by which the complex amplitude provided for the tone in the synchronizing frame is multiplied before being supplied to the IFFT unit 26. A complementary scaling can be effected in the receiver 12.

As an alternative, a stored pseudo-random sequence from the source 24 could simply be allocated to those tones for which the bit allocation table indicates that there is a sufficient SNR (signal-to-noise ratio), the sequence being truncated when all of the tones which are being used in the synchronizing frame have been allocated pseudo-random data. Again, the receiver stores the same bit allocation table as the transmitter, so that the desired correlation can be performed correctly. As a further alternative, it is observed that not all of the available tones necessarily need be used in the synchronizing frame for the purposes of frame synchronization.

For frame synchronization, as shown in FIG. 1 the receiver 12 includes a synchronizing sequence source 58 which corresponds to and produces the same synchronizing sequence as the source 24 in the transmitter, and a correlator 60 and store 62 to which the contents of each received synchronizing frame (or what the receiver understands to be each received synchronizing frame, i.e. every Q-th frame or multicarrier symbol) are supplied from the output of the FEQ in the unit 40. The FEQ coefficients which are used for the synchronizing frame may be different from those used for the data frames. The receiver further includes a weighting multiplier 64 via which the synchronizing sequence from the source 58 is supplied to the correlator 60, a complex derotation multiplier 66 for supplying to the correlator 60 the received synchronizing frame contents multiplied by complex derotation values as described below, and a frame synchronization decision unit 68. The unit 68 is responsive to correlation results produced by the correlator 60 to determine the presence or absence of frame synchronization and, via a path 70, to make corrective changes to the frame boundaries used by the buffer 36 when necessary as described below.

When the transmission system including the transmitter 10 and the receiver 12 is initialized, frame synchronization is established in a manner for example as discussed below. In subsequent normal operation, frame synchronization is maintained without any change of frame boundaries being required. As described below, in this normal operating situation the correlator 60 and decision unit 68 monitor the frame synchronization. In the event of a loss of frame synchronization (in the presence of frequency synchronization, indicating that the receiver 12 is receiving a signal via the path 18), frame synchronization must be restored. While this can be done (as in the prior art) by re-initializing the system, this is very undesirable because the initializing process is relatively slow, for example taking about 20 seconds, resulting in a substantial interruption in the operation of the system.

An actual loss of frame synchronization may arise for example as a result of a printed circuit card containing the transmitter 10 being pulled from an equipment rack (resulting in a loss of signal, and frequency synchronization, at the receiver 12) and then being reinserted (the signal and frequency synchronization thereby being restored at the receiver). A loss of frame synchronization may also be indicated by the monitoring in the event that there is excessive noise which produces a poor correlation result, even though there is no actual loss of frame synchronization. In this case, no frame resynchronization is necessary or desired. The invention permits a distinction to be made between these situations, and in the event of an actual loss of frame synchronization generally enables frame synchronization to be restored, and thereby maintained without any re-initialization of the system, within a very short period for example of less than about 100 ms.

The operation of the components 58 to 68 is described further below with additional reference to the flow chart in FIG. 2.

Figure 2:
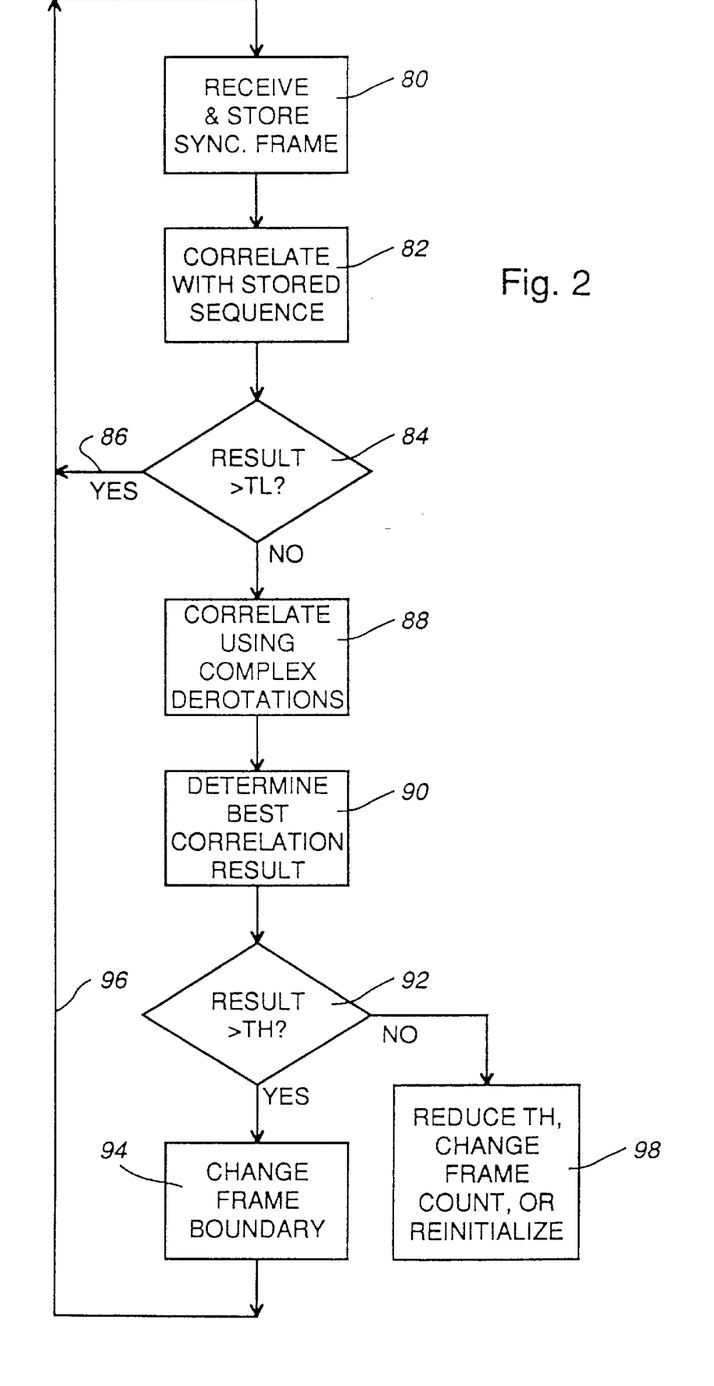
FIG. 2 is a flow chart illustrating steps for maintaining and restoring frame synchronization in the transmission system of FIG. 1.

In a frame synchronized state, as shown by a block 80 in FIG. 2 the received contents of each synchronizing frame, i.e. each 69-th frame or multicarrier symbol, are supplied from the output of the FEQ in the unit 40 and stored in the store 62. It is observed that these contents are complex amplitudes in the frequency domain, representing the complex amplitudes of the tones of the synchronizing frame. As shown by a block 82 in FIG. 2, these synchronizing frame contents are also supplied, either directly or from the store 62, to the correlator 60 where they are correlated with the synchronizing sequence supplied from the store 58 via the weighting multiplier 64. This correlation consists of a multiplication of each complex amplitude supplied from the output of the FEQ in the unit 40 by a corresponding complex amplitude of the synchronizing sequence from the store 58, weighted by the multiplier 64 in accordance with a respective weighting factor as described below, and a summation of the real parts of the complex amplitude products to produce a single real correlation result at the output of the correlator 60.

In the simplest case, the weighting coefficients used by the weighting multiplier 64 comprise either a binary 1 or 0 for each tone or complex amplitude, indicating that the tone respectively is or is not being used to contribute to the correlation. Thus for example the pilot tone always has a weighting coefficient of 0, because it is the reference for frequency synchronization, the control loop for which removes any phase errors from the pilot tone. Similarly, any other tones not currently being used (i.e. with a bit allocation of zero) can have a weighting coefficient of 0, and tones being used for transmission can have a weighting coefficient of 1. It can be seen that the weighting coefficients can be readily derived from the bit allocation table which is provided at the receiver 12.

More desirably, each coefficient used by the weighting multiplier 64 provides a weighting for the complex amplitude of the respective tone depending on the SNR (signal-to-noise ratio) of the respective tone. This weighting can be based on the SNR for each tone as determined during initialization of the system (this being used in determining the bit allocations for the tones), or it can be based on the adaptive mean squared errors of the tones (which can be updated as frequently as every multicarrier symbol) which provide a measure of the current SNR for each tone, whereby the weighting coefficients are also adaptively updated. The use of mean squared errors and their association with bit allocations and SNR are described in the related applications by R. R. Hunt et al. and P. S. Chow et al. referred to above.

As shown by a block 84 in FIG. 2, the decision unit 68 determines whether the correlation result produced by the correlator 60 exceeds a threshold TL. In the normal situation of frame synchronization this will be the case, and no further action is taken. FIG. 2 shows a return path 86 to the block 80 for the next synchronizing frame, and meanwhile data is supplied from the other frames or multicarrier symbols via the units 38 and 40 to the output path 42 in FIG. 1. The threshold TL is set at a relatively low value, so that the correlation result will generally exceed this even in the presence of substantial noise, so that false determinations of a loss of frame synchronization are substantially avoided. In addition, although not shown in FIG. 2, a counter may be provided for requiring repeated failures of the correlation result to exceed the threshold TL in successive synchronizing frames before a loss of frame synchronization is determined.

In the event that the correlation result does not exceed the threshold TL (in the requisite number of, e.g. 2, successive synchronizing frames), a block 88 in FIG. 2 is reached.

As represented by the block 88 and further described below, in each of the next 64 data frames, following the synchronizing frame for which a loss of frame synchronization has been determined, the correlator 60 performs a correlation of the received synchronizing frame contents from the store 62, multiplied in the complex derotation multiplier 66 by a respective set of complex derotations, with the synchronizing sequence from the source 58 weighted as described above. Consequently, the correlator 60 produces 64 correlation results, one in each of these 64 data frames. As shown by a block 90 in FIG. 2, the decision unit 68 determines a best one of these correlation results, and as shown by a block 92 in FIG. 2 determines whether this exceeds a resynchronization threshold TH. The threshold TH is set at a higher level than the threshold TL, for example at about half the maximum possible correlation result for a frame synchronized state, so that false resynchronization results are substantially avoided. Again in this case, but not shown in FIG. 2, a counter may be provided to require repeated similar results from the processes of the blocks 88 to 92 in successive superframes before a resynchronization is effected.

In response to the correlation result exceeding the threshold TH as determined in the block 92, a block 94 in FIG. 2 is reached in which the unit 68 changes the frame boundary in a single step, by control of a pointer in the buffer 36 via the path 70, as described further below. This change can be effected during the remaining 68−64=4 data frames, so that resynchronization is effected before, and can be confirmed with, the next synchronizing frame as shown in FIG. 2 by a path 96 from the block 94 to the block 80. Thus resynchronization in response to a detected loss of frame synchronization can be effected in a single superframe, or in a few superframes if the counters mentioned above are also provided, whereby frame synchronization is substantially continuously maintained For example, with the sampling frequency of 2.208 MHz, 544 time domain samples in each frame, and 69 frames in each superframe as described above, the superframe period is 17 ms. If both of the counters mentioned above are provided to have a required count of 2, the loss of frame synchronization is detected and resynchronization as described above is completed within four superframes, or 68 ms.

If in the block 92 it is determined that no correlation result exceeds the threshold TH, then a block 98 in FIG. 2 is reached. In this block a variety of possible actions can be taken. For example, the value of the threshold TH can be reduced to increase the likelihood of an affirmative result in the block 92, or a frame count can be changed by changing the pointer in the buffer 36 to examine a different frame for the synchronizing sequence, or the system may be re-initialized. In practice, it has been found that the processes of blocks 88 and 90 invariably result in an affirmative result in the block 92; thus the resynchronization process is highly effective.

If the discrete Fourier transform of a finite length discrete sequence is defined as $$F(n) = \sum_{k=0}^{N-1} f(k) W_N^{-kn},$$

where $W_N = e^{j2\pi/N}$ is the principal N-th root of unity, and the finite length sequence is then repeated periodically to form an N-periodic sequence, it can be shown that the time shift property is satisfied, i.e.

$$f(k - m) \xleftrightarrow{DFT;N} W_N^{-mn} F(n).$$

$W_N$ is a complex rotation, and thus the time shift of the periodic sequence f(k) results in complex rotations of the frequency domain samples of F(n), the amount of rotation depending on the frequency n and the time shift m.

In the transmission system as described above, the synchronizing sequence is not periodically repeated as an N-periodic sequence, but rather is preceded and followed by data from the path 20 as described above. However, the data has a random nature relative to the synchronizing sequence, and the above characteristics can be applied to the synchronizing frame with reasonably accurate results.

A loss of frame synchronization in the system, while frequency synchronization is present as discussed above, corresponds to a time shift of the data samples supplied to the buffer 36 relative to the buffer pointer. In the system as described herein, in which the sampling frequency is 8 times the pilot tone used for frequency synchronization, this time shift can only be by an integer multiple of ±8 samples. With a symbol size of N=512 (512 point IFFT unit 26 and FFT unit 36), there are thus 512/8=64 possible time shifts per frame or multicarrier symbol. Each of these possible time shifts is compensated by a respective one of the 64 sets of complex derotations used by the multiplier 66, in accordance with the above equations. To accommodate time shifts in either direction, the 64 possible time shifts are used to represent time shifts by up to half a frame in each of the positive and negative directions. In other words, each set of complex derotations by the multiplier 66 corresponds to a respective time shift of data samples in the buffer 36 by ±8, ±16, . . . ±256 samples. Because the rotation is recursive, only one set of complex derotations need be stored at the receiver 12.

Thus for the block 88 in FIG. 2, each of the 64 data frames referred to above is used for calculation of a correlation result for a respective one of the 64 possible time shifts m. In the multiplier 66, the complex amplitude for each tone n supplied from the store 62 is multiplied by the respective complex derotation $W_N^{-mn}$, and the resulting products are correlated in the correlator 60 with the weighted complex amplitudes of the synchronizing sequence supplied from the store 58 via the weighting multiplier 64, the real parts of the correlation products being summed to produce the correlation result for the respective time shift m. The correlation process is sufficiently accurate that, in the event that the loss of frame synchronization is due to one of the possible time shifts m being evaluated, the correlation result for that time shift exceeds the threshold TH whereas the correlation results for all other possible time shifts are much less than the threshold TH. The decision unit 68 thereby reliably determines the time shift m which has produced the loss of frame synchronization, and via the path 70 as described above adjusts the pointer of the buffer 36 in a single step to correct this time shift, whereby frame synchronization is restored. This resynchronization is effected without any searching process for the synchronizing sequence.

In the event that no correlation result produced at the block 88 exceeds the threshold TH, then as indicated above this threshold can be lowered, or it can be concluded that a larger time shift has caused the loss of frame synchronization. In the latter case, time shifts greater than one frame can be accommodated by changing the frame count to examine a different frame for the synchronizing sequence, the above steps then being repeated for the different frame count, and this search being continued for different ones of the 69 frames until the threshold TH is exceeded. Alternatively, the system may be re-initialized. In either case a significant time delay is involved in restoring frame synchronization, but as stated above this event is unlikely in practice.

Frame synchronization must be established on initializing the system, as indicated above. The initializing process includes a training method for the TEQ 34 in the receiver 12, as described in an article by J. S. Chow et al. entitled "Equalizer Training Algorithms for Multicarrier Modulation Systems", 1993 International Conference on Communications, pages 761–765, May 1993. At the end of the training of the TEQ 34, an equalized channel response b and an equalizer response (i.e. equalizer coefficients) w are obtained in the time domain by transformation by an IFFT. The relative offset between the starting locations of b and w in the time domain determines the desirable delay for the received signal, which in turn determines the multicarrier symbol or frame boundary at the receiver which is used to provide initial frame synchronization.

Alternatively, the correlation process described above can also be applied for initially establishing frame synchronization, each frame being used (during initialization) to carry the synchronizing sequence and a time shift being performed as described above in order to establish frame synchronization. As this process makes use of the FEQ coefficients (i.e. the correlation is of information derived from the output of the FEQ in the unit 40, and thus presumes appropriate settings of the FEQ coefficients), it is in this case necessary first to compute an appropriate set of FEQ coefficients. This can be done from the channel response which is identified during the initializing process, the FEQ coefficients being determined so that the demodulated signal constellation is scaled and rotated into grids of fixed distance for ease of decoding.

As a further alternative, frame synchronization can initially be established from the synchronizing sequence and the channel response determined during initialization by measuring the SNR for each tone for all of the 512 possible frame boundary alignments, and selecting as the frame boundary that alignment which results in the best SNR performance.

The particular numbers, inter-relationships, and details given above obviously may all be varied to suit particular requirements. For example, although as described above the sampling frequency is 8 times the pilot tone frequency, this need not be the case, but is preferred because this integer-power-of-two relationship considerably simplifies the digital signal processing which must be performed in the receiver 12. Similarly, the size of Q=69 frames per superframe conveniently accommodates the correlation for the resulting 64 possible time shifts, up to ±256 samples, at a rate of one per frame, within the superframe, allowing additional time to implement the frame boundary shift before the next synchronizing frame as described above.

In addition, although the invention has been described for only the downstream direction of transmission, it may equally be applied to the upstream direction of transmission, using either the same or (especially for an ADSL system having different rates of transmission and different IFFT and FFT sizes for the two transmission directions) different parameters. Again, although the invention has been described in the specific context of DMT modulation, it may also be applied to transmission systems using other forms of multicarrier modulation.

Thus although a particular embodiment of the invention has been described in detail, it should be appreciated that these and numerous other modifications, variations, and adaptations may be made without departing from the scope of the invention as defined in the claims.

What is claimed is:

1. A method for transmitting a pattern in a multicarrier modulation transmission system utilizing a plurality of frequency tones, said method comprising:

obtaining a pattern, the pattern being a pseudo-random sequence of N values, the N values are determined by the following equations:

$x[p]=1$ for $p=1$ to 9, $x[p]=x[p-4]\oplus x[p-9]$ for $p=10$ to N, where N is an integer greater than 10, and where $x[p]$ represents a binary value of the $p^{th}$ value of the pseudo-random sequence, and $\oplus$ represents modulo-2 addition; and transmitting at least a portion of the pattern, the portion including those of the values of the pattern that correspond to the frequency tones that are active.

2. A method as recited in claim 1, wherein the values of the pattern being transmitted are consecutive or non-consecutive values of the pattern.

3. A method as recited in claim 1, wherein said transmitting operates to periodically transmit the pattern.

4. A method as recited in claim 1, wherein when N is greater then 130, then the $129^{th}$ and $130^{th}$ values in the pattern are converted to zero.

5. A method as recited in claim 1, wherein N is 512.

6. A method as recited in claim 1, wherein when N is 512, the binary values of the pattern are grouped into 256 pairs of values, each of the pairs corresponding to a frequency tone of the multicarrier modulation transmission system, and wherein the $129^{th}$ and $130^{th}$ values in the pattern are converted to zero for the $64^{th}$ frequency tone which is a pilot tone.

7. A method as recited in claim 1, wherein said transmitting of the pattern groups the values of the pseudo-random sequence into N/2 pairs of values.

8. A method as recited in claim 7, wherein a first of the N/2 pairs of values is used for d.c. and Nyquist sub-carriers within the multicarrier modulation transmission system and the remaining (N/2−1) pairs of values is used for tones of a multicarrier symbol.

9. A method as recited in claim 7, wherein a plurality of the N/2 pairs of values are used for tones of a multicarrier symbol.

10. A method as recited in claim 9, wherein the multicarrier symbol is a synchronizing frame multicarrier symbol.

11. A method as recited in claim 9, wherein each of the pairs of values determines a complex number.

12. A method as recited in claim 9, wherein each of the pairs of values is represented as $(X_i, Y_i)$, and each of the pairs determines a complex number $Z_i=X_i+Y_i$ for a constellation used in modulation the multicarrier symbol for transmission.

13. A method as recited in claim 1, wherein said transmitting comprises:
grouping the values of the pseudo-random sequence into a plurality of pairs of binary values; and
mapping one of the binary values to a positive energy level and mapping the other of the binary values to a negative energy level.

14. A method as recited in claim 13,
wherein each of the mapped pairs corresponds to a frequency tone of the multicarrier modulation transmission system, and
wherein said transmitting further comprises:
modulating at least a subset of the frequency tones in accordance with the mapped pairs.

15. A method for transmitting a predetermined time domain signal in a multicarrier modulation transmission system, said method comprising:
obtaining a predetermined time domain signal to be transmitted, the predetermined time-domain signal is defined such that if an inverse transformation of the predetermined time-domain signal were performed after inverse mapping positive energy levels to one binary value and negative energy levels to another binary value, the resulting frequency domain version would be a set of j values, with the j values corresponding to at least a subset of frequency tones being used by the multicarrier modulation transmission system to carry information, the set of j values being chosen from a sequence of N values determined by the following equations:

$x[p]=1$ for $p=1$ to 9, $x[p]=x[p-4]\oplus x[p-9]$ for $p=10$ to N, where j and N are integers greater than 1, j is less than or equal to N, and N is greater than 10, and where x[p] represents a binary value of the $p^{th}$ value of the sequence, and $\oplus$ represents modulo-2 addition; and
transmitting the predetermined time domain signal.

16. A method as recited in claim 15, wherein said transmitting operates to periodically transmits the predetermined time domain signal.

17. A method as recited in claim 15, wherein if N is greater than 130, then the $129^{th}$ and $130^{th}$ values in the pseudo random sequence of N values are zero despite the equations.

18. A method as recited in claim 15, wherein N is 512.

19. A transmitter for a multicarrier modulation transmission system, said transmitter comprising:
a coder, said coder receives a data stream divided into frames and encodes the frames into frequency domain multicarrier symbols;
a pattern supplier, said pattern supplier inserts a pattern into the data stream, the pattern is a set of j values chosen from a sequence of N values, the N values are determined by the following equations:

$x[p]=1$ for $p=1$ to 9, $x[p]=x[p-4]\oplus x[p-9]$ for $p=10$ to N, where j and N are integers greater than 1, j is less than or equal to N, and N is greater than 10, and where x[p] represents a binary value of the $p^{th}$ value of the sequence, and $\oplus$ represents modulo-2 addition; and
an output circuit to couple the data stream to a transmission path.

20. A transmitter as recited in claim 19,
wherein said transmitter comprises:
modulator, said modulator modulates the encoded frames into multicarrier symbols to be the data stream, and
wherein said pattern supplier supplies the pattern into the data stream either before or after said modulator.

21. A transmitter as recited in claim 19, wherein the transmission path is a two-wire telephone subscriber line.

22. A transmitter as recited in claim 19, wherein said modulator unit is a discrete multitone transmitter.

23. A transmitter as recited in claim 19, wherein if N is greater then 130, then the $129^{th}$ and $130^{th}$ values in pattern are zero despite the equations.

24. A transmitter as recited in claim 19, wherein prior to coupling the data stream to the transmission path, said transmitter groups the j values of the pattern into a plurality of pairs of binary values, and maps one of the binary values to a positive energy level and maps the other of the binary values to a negative energy level.

25. A transmitter as recited in claim 24,
wherein each of the mapped pairs corresponds to a frequency tone of the multicarrier modulation transmission system, and
wherein said transmitter further includes
a modulator, said modulator modulates the encoded frames into multicarrier symbols to be the data stream by modulating at least a subset of the frequency tones in accordance with the mapped pairs.

26. A transmitter as recited in claim 19, wherein prior to coupling the data stream to the transmission path, said transmitter maps one of the binary values of the j values to a positive energy level and maps the other of the binary values of the j values to a negative energy level, and then groups the mapped energy levels of the pattern into a plurality of pairs of values.

27. A transmitter as recited in claim 26,
wherein each of the mapped pairs corresponds to a frequency tone of the multicarrier modulation transmission system, and
wherein said transmitter further includes
modulator, said modulator modulates the encoded frames into multicarrier symbols to be the data stream by modulating at least a subset of the frequency tones in accordance with the mapped pairs.

28. A transmitter as recited in claim 19, wherein said transmitter comprises:
means for grouping the values of the pattern into a plurality of pairs of values; and
means for mapping one of the values of the pattern to a positive energy level and mapping the other of the values of the pattern to a negative energy level.

29. A transmitter as recited in claim 28,
wherein each of the mapped pairs corresponds to a frequency tone of the multicarrier modulation transmission system, and wherein said transmitter further includes
a modulator, said modulator modulates the encoded frames into multicarrier symbols to be the data stream by modulating at least a subset of the frequency tones in accordance with the mapped pairs.

30. A transmitter for a multicarrier modulation transmission system, said transmitter comprising:

a coder, said coder receives a data stream divided into frames and encodes the frames into frequency domain multicarrier symbols;

a storage area, said storage area storing a predetermined time domain signal to be transmitted along with the data stream, the predetermined time-domain signal is defined such that if an inverse transformation of the predetermined time-domain signal were performed after inverse mapping positive energy levels to one binary value and negative energy levels to another binary value, the resulting frequency domain version would be a set of j values, with the j values corresponding to at least a subset of frequency tones being used by the multicarrier modulation transmission system to carry information, the set of j values being chosen from a sequence of N values determined by the following equations:

$x[p]=1$ for $p=1$ to 9, $x[p]=x[p-4] \oplus x[p-9]$ for $p=10$ to N, where j and N are integers greater than 1, j is less than or equal to N, and N is greater than 10, and where $x[p]$ represents a binary value of the $p^{th}$ value of the sequence, and $\oplus$ represents modulo-2 addition; and an output circuit to couple the data stream and the predetermined time domain signal to a transmission path.

31. A transmitter as recited in claim 30, wherein the transmission path is a two-wire telephone subscriber line.

32. A transmitter as recited in claim 30,
wherein said transmitter comprises:
a modulator, said modulator modulates the encoded frames into multicarrier symbols to be the data stream, and
wherein said storage area supplies the predetermined time domain signal into the data stream after said modulator.

33. A transmitter as recited in claim 32, wherein said modulator is a discrete multitone transmitter and N is 512.

34. A transmitter as recited in claim 30, wherein if N is greater than 130, then the $129^{th}$ and $130^{th}$ values in the inverse transformation of the predetermined time-domain signal are zero despite the equations.

35. A method of monitoring frame synchronization in a multicarrier modulation transmission system in which a synchronizing frame containing at least a synchronizing pattern is transmitted, said method comprising:

(a) receiving values of the synchronizing frame;

(b) comparing the values of the synchronizing frame with corresponding stored values of the synchronizing pattern to produce a comparison result; and (c) comparing the comparison result with at least one threshold value to provide an indication of existence or loss of frame synchronization, wherein the synchronizing pattern includes a set of j values chosen from a sequence of N values, the N values are determined by the following equations:

$x[p]=1$ for $p=1$ to 9, $x[p]=x[p-4] \oplus x[p-9]$ for $p=10$ to N, where j and N are integers greater than 1, j is less than or equal to N, and N is greater than 10, and where $x[p]$ represents a binary value of the $p^{th}$ value of the sequence, and $\oplus$ represents modulo-2 addition.

36. A method as recited in claim 35, wherein said method further comprises:

(d) determining an adjustment amount to restore frame synchronization when said comparing (c) indicates that the frame synchronization has been lost; and (e) adjusting a frame boundary in accordance with the adjustment amount to restore frame synchronization.

37. A method for transmitting a synchronization frame for frame synchronization in a multicarrier modulation transmission system having a transmitter and a receiver, said method comprising:

transmitting a set of data over a transmission path the set including a plurality of data frames;

utilizing, within each of the data frames, at least one of the carriers at the transmitter of the multicarrier modulation transmission system to transmit a frequency synchronization signal to the receiver; and periodically transmitting a synchronization frame interposed between the set of data and a next set of data, the synchronizing frame containing at least a synchronizing pattern, wherein the synchronization frame is used at the receiver to monitor and/or restore frame synchronization as is needed, wherein the frame synchronization pattern includes j values, the j values are chosen from N values of a sequence determined by the following equations:

$x[p]=1$ for $p=1$ to 9, $x[p]=x[p-4] \oplus x[p-9]$ for $p=10$ to N, where j and N are integers greater than 1, j is less than or equal to N, and N is greater than 10, and where $x[p]$ represents a binary value of the $p^{th}$ value of the sequence, and $\oplus$ represents modulo-2 addition.

38. A method as recited in claim 37, wherein said multicarrier modulation system includes a discrete multitone transmitter, and said discrete multitone transmitter performs said transmitting.

39. A method as recited in claim 38, wherein the transmission path is a two-wire telephone subscriber line.

40. A method for transmitting a frame synchronization pattern in a multicarrier modulation transmission system utilizing a plurality of frequency tones, said method comprising:

obtaining a frame synchronization pattern having values;

grouping the values into pairs of binary values;

mapping one of the binary values to a positive energy level and mapping the other of the binary values to a negative energy level;

assigning each of the mapped pairs to a corresponding one of the frequency tones of the multicarrier modulation transmission system;

modulating at least a subset of the frequency tones in accordance with the mapped pairs corresponding thereto to produce modulated frame synchronization data; and transmitting the modulated frame synchronization data.

41. A method as recited in claim 40, wherein the modulated frame synchronization data is a multicarrier symbol.

42. A method as recited in claim 40, wherein each of the pairs of binary values determines a complex number, each of the pairs of binary values is represented as $(X_i, Y_i)$, and each of the pairs determines a complex number $Z_i = X_i + Y_i$ for a constellation used in modulation the multicarrier symbol for transmission.

43. A method as recited in claim 40, wherein the frame synchronization pattern includes j values, the j values are chosen from N values of a sequence determined by the following equations:

$x[p]=1$ for $p=1$ to 9, $x[p]=x[p-4] \oplus x[p-9]$ for $p=10$ to N, where j and N are integers greater than 1, j is less than or equal to N, and N is greater than 10, and where $x[p]$ represents a binary value of the $p^{th}$ value of the sequence, and $\oplus$ represents modulo-2 addition.

* * * * *

US005901180C1

(12) EX PARTE REEXAMINATION CERTIFICATE (5202nd)
United States Patent
Aslanis et al.

(10) Number: US 5,901,180 C1
(45) Certificate Issued: *Sep. 13, 2005

(54) FRAME SYNCHRONIZATION IN MULTICARRIER TRANSMISSION SYSTEMS

(75) Inventors: James T. Aslanis, Mountain View, CA (US); Jacky S. Chow, Mountain View, CA (US)

(73) Assignee: Texas Instruments Incorporated, Dallas, TX (US)

Reexamination Request:
No. 90/006,903, Jan. 9, 2004

Reexamination Certificate for:
Patent No.: 5,901,180
Issued: May 4, 1999
Appl. No.: 08/770,702
Filed: Dec. 19, 1996

( * ) Notice: This patent is subject to a terminal disclaimer.

Related U.S. Application Data

(63) Continuation of application No. 08/275,409, filed on Jul. 15, 1994, now Pat. No. 5,627,863.

(51) Int. Cl.⁷ .......................... H04L 7/06; H04L 23/02
(52) U.S. Cl. ...................... 375/261; 375/364; 375/367; 370/480; 370/515
(58) Field of Search ............................... 375/260, 261, 375/298, 362, 364, 365, 367; 370/464, 480, 483, 485, 491, 500, 503, 509, 510, 512, 515

(56) References Cited

U.S. PATENT DOCUMENTS

| | | | |
|---|---|---|---|
| 5,228,025 A | * 7/1993 | Le Floch et al. | 370/206 |
| 5,343,499 A | * 8/1994 | Jasper et al. | 375/261 |
| 5,400,322 A | 3/1995 | Hunt et al. | |
| 5,479,447 A | 12/1995 | Chow et al. | |
| 5,596,604 A | 1/1997 | Cioffi et al. | |

OTHER PUBLICATIONS

Proakis, *Digital Communications*, 2d ed. (McGraw–Hill, Inc., 1989), pp. 396–399 and 862–865.

Cioffi et al., "DMT Specification Overview for ADSL", Submission T1E1.4/93–083 to the T1E1.4 Working Group of Committee T1, sponsored by the Alliance for Telecommunications Information Solutions and accredited by the American National Standards Institute (Apr. 15, 1993).

Cioffi et al., "Detailed DMT Transmitter Description for ADSL", Submission T1E1.4/93–084 to the T1E1.4 Working Group of Committee T1, sponsored by the Alliance for Telecommunications Information Solutions and accredited by the American National Standards Institute (Apr. 15, 1993).

Chow et al., "Recommended Reverberaton Training Sequence–Revision 1", Submission T1E1.4/93–086–R1 to the T1E1.4 Working Group of Committee T1, sponsored by the Alliance for Telecommunications Information Solutions and accredited by the American National Standards Institute (May 10, 1993).

Cioffi et al., "Recommended Training Sequence for SNR Computation with DMT ADSL", Submission T1E1.4/93–087 to the T1E1.4 Working Group of Committee T1, sponsored by the Alliance for Telecommunications Information Solutions and accredited by they American National Standards Institute (May 10, 1993).

(Continued)

Primary Examiner—Chieh M. Fan (57) ABSTRACT

A discrete multitone modulation transmission system is described in which frame synchronization is monitored using a transmitted synchronizing frame. The existence or loss of frame synchronization is determined by comparing the values of the synchronizing frame with corresponding stored values.

OTHER PUBLICATIONS

Cioffi et al., "Modification to DMT Synchronization Pattern Insertion", Submission T1E1.4/93–089 to the T1E1.4 Working Group of Committee T1, sponsored by the Alliance for Telecommunications Information Solutions and accredited by the American National Standards Institute (Apr. 15, 1993).

Chow, "Recommended Reveille Sequence for DMT ADSL", Submission T1E1.4/93–114 to the T1E1. 4 Working Group of Committee T1, sponsored by the Alliance for Telecommunications Information Solutions and accredited by the American National Standards Institute (May 10, 1993).

Bingham, "Proposed Standard: Sections 6.6–6.10 & 7.6–7.10 Encoders, Modulators, Cyclic Prefices, DACs, and Anti–aliassing Filters", Submission T1E1.4/93–120 to the T1E1.4 Working Group of Committee T1, sponsored by the Alliance for Telecommunications Information Solutions and accredited by the American Natoinal Standards Institute (May 10, 1993).

"Asymmetric Digital Subscriber Line (ADSL) Working Draft Standard", Marshall, ed., (T1E1.4 Working Group of Committee T1, Nov. 15, 1993).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 15–18 and 30–36 are cancelled.

Claims 1, 7, 19, 37 and 40 are determined to be patentable as amended.

Claims 2–6, 8–14, 20–29, 38, 39 and 41–43, dependent on an amended claim, are determined to be patentable.

1. A method for transmitting a pattern in a multicarrier modulation transmission system utilizing a plurality of frequency tones, said method comprising:

obtaining a pattern, the pattern being a pseudo-random sequence of N values, the N values are determined by the following equations:

$x[p]=1$ for $p=1$ to 9, $x[p]=x[p-4] \oplus x[p-9]$ for $p=10$ to N, where N is an integer greater than 10, and where $x[p]$ represents a binary value of the $p^{th}$ value of the pseudo-random sequence, and $\oplus$ represents modulo-2 addition;

*allocating a number of bits for each of the plurality of frequency tones based on a signal-to-noise ratio for the tone;* and transmitting [at least] a portion of the pattern, the portion including those of the values of the pattern that correspond to the frequency tones that are [active] *allocated at least a predetermined number of bits, and suppressing the amplitude of at least one of the frequency tones that is allocated fewer than said predetermined number of bits*.

7. A method as recited in claim 1, [wherein said transmitting of the pattern groups] *further comprising the step of grouping* the values of the pseudo-random sequence into N/2 pairs of values.

19. A transmitter for a multicarrier modulation transmission system, said transmitter comprising:

a coder, said coder receives a data stream divided into frames and encodes the frames into frequency domain multicarrier symbols;

a pattern supplier, said pattern supplier inserts a pattern into the data stream, the pattern is a set of j values chosen from a sequence of N values, the N values are determined by the following equations:

$x[p]=1$ for $p=1$ to 9, $x[p]=x[p-4] \oplus x[p-9]$ for $p=10$ to N, where j and N are integers greater than 1, j is less than or equal to N, and N is greater than 10, and where $x[p]$ represents a binary value of the $p^{th}$ value of the sequence, and $\oplus$ represents modulo-2 addition, *where each pair of the binary values defines a complex amplitude for a corresponding one of a plurality of frequency tones of the multicarrier modulation transmission system, each tone having a bit allocation based on a signal-to-noise ratio for the tone, and where the complex amplitude is suppressed for at least one of the plurality of frequency tones that is allocated fewer than a predetermined number of bits*; and an output circuit to couple the data stream to a transmission path.

37. A method for transmitting a synchronization frame for frame synchronization in a multicarrier modulation transmission system having a transmitter and a receiver, said method comprising:

transmitting a set of data over a transmission path the set including a plurality of data frames;

utilizing, within each of the data frames, at least one of the carriers at the transmitter of the multicarrier modulation transmission system to transmit a frequency synchronization signal to the receiver; and periodically transmitting a synchronization frame interposed between the set of data and a next set of data, the synchronizing frame containing at least a synchronizing pattern, wherein the synchronization frame is used at the receiver to monitor and/or restore frame synchronization as is needed, wherein the frame synchronization pattern includes j values, the j values are chosen from N values of a sequence determined by the following equations:

$x[p]=1$ for $p=1$ to 9, $x[p]=x[p-4] \oplus x[p-9]$ for $p=10$ to N, where j and N are integers greater than 1, j is less than or equal to N, and N is greater than 10, and where $x[p]$ represents a binary value of the $p^{th}$ value of the sequence, and $\oplus$ represents modulo-2 addition, *where each pair of the binary values defines a complex amplitude for a corresponding one of a plurality of frequency tones of the multicarrier modulation transmission system, each tone having a bit allocation based on a signal-to-noise ratio for the tone, and where the complex amplitude is suppressed for at least one of the plurality of frequency tones that is allocated fewer than a predetermined number of bits*.

40. A method for transmitting a frame synchronization pattern in a multicarrier modulation transmission system utilizing a plurality of frequency tones, said method comprising:

*allocating a number of bits for each of the plurality of frequency tones based on a signal-to-noise ratio for the tone;* obtaining a frame synchronization pattern having values;

grouping the values into pairs of binary values;

mapping one of the binary values to a positive energy level and mapping the other of the binary values to a negative energy level;

assigning each of the mapped pairs to a corresponding one of the frequency tones of the multicarrier modulation transmission system;

modulating at least a subset of the frequency tones in accordance with the mapped pairs corresponding thereto to produce modulated frame synchronization data; and transmitting the modulated frame synchronization data *for those frequency tones that are allocated at least a predetermined number of bits and suppressing the amplitude of at least one of the frequency tones that is allocated fewer than said predetermined number of bits*.

* * * * *